Figure 1:
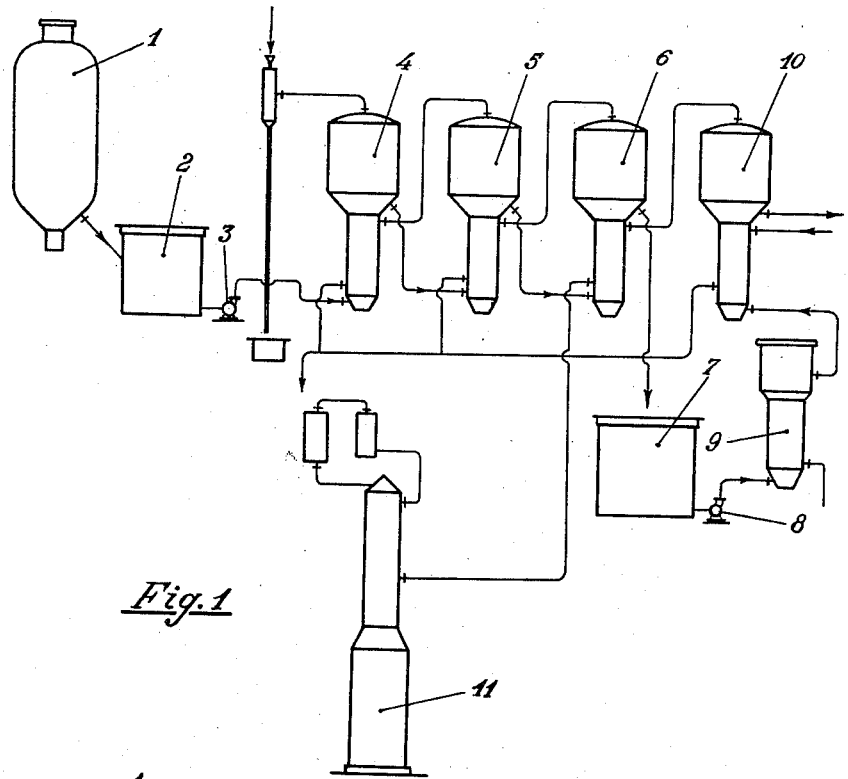

Oct. 23, 1956

G. DIOTTI 2,768,176

PROCESS FOR THE RECOVERY OF FURFURAL AND
A FUEL FROM WASTE BISULFITE LIQUOR

Filed Jan. 23, 1952

Inventor
Giacinto Diotti
By Wenderoth, Lind & Ponack
Attorneys

United States Patent Office 2,768,176
Patented Oct. 23, 1956

2,768,176

PROCESS FOR THE RECOVERY OF FURFURAL AND A FUEL FROM WASTE BISULFITE LIQUOR

Giacinto Diotti, Milan, Italy, assignor of one-half to Snia Viscosa, Societa Nazionale Industria Applicazioni Viscosa, Societa per Aziona, Milan, Italy, an Italian joint-stock company Application January 23, 1952, Serial No. 267,740

Claims priority, application Italy January 25, 1951

5 Claims. (Cl. 260—347.9)

Wood is one of the main sources of cellulose which in turn is an essential raw material for many chemical industries. However, cellulose in wood is associated with other substances which must be removed, if a sufficiently pure cellulose for most common industrial purposes is to be obtained. Amongst the associated substances with cellulose, first consideration must be given to lignin and its related compounds in the class of polyoses or polysaccharides. The same polyoses are not always encountered in all class of woods; for example the hexosans are mainly encountered in the Coniferae, while the pentosans, as xylan, prevail in deciduous woods.

The bisulfite process—usually carried out with calcium bisulfite, $Ca(HSO_3)_2$—is the most frequently utilized industrial process amongst the many available procedures to obtain semi-pure cellulose from wood. The bisulfite process is carried out with many different modifications and varieties of equipment, which are already well known, and these have therefore not been included in this specification. In the bisulfite process nearly all of wood components other than cellulose go into solution in the bisulfite liquor, which is termed: "exhausted liquor." In the interest of brevity, the liquid discharged after a charge of wood has been digested with a bisulfite (which need not necessarily be calcium bi-sulfite) to leave in the digester a solid mass consisting almost entirely cellulose, is hereinafter termed: "liquor," notwithstanding its variation in composition. Lignin is contained in this liquor in the form of its sulfonic acid salts, and the liquor also contains the products of the hydrolysis which the polyoses have undergone in the course of the process. These hydrolysis products in the liquor are mainly hexoses, if woods rich in hexosans have been utilized as a starting material. The liquor will contain mainly pentoses if pentosan rich woods have been utilized as the starting material. It should be understood that the present invention can be carried into effect not only with bisulfite liquors, but also with liquors obtained from different procedures, provided they contain wood pentosans or pentoses derived from the hydrolysis thereof, or substances liable to be converted into pentosans or pentoses and the like, which can be separated from the liquor by distillation.

As already known, the problem of liquor utilization (the liquor, due to its composition, cannot be freely discharged into a sewage system) has already been the object of many investigations. It has been ascertained that, by evaporating the liquor in a suitable multiple stage concentrator, a concentrated liquid, utilizable as a low grade liquid fuel, can be obtained, and frequently such a mode of utilization is often economically justified. However, in the case of liquors having a substantial pentose content, the theoretical possibility exists to obtain furfural therefrom through processing with acids or salts and a subsequent distillation whereby, cyclization of the pentose molecules occurs, with a loss of water to form a 5 membered heterocyclic nucleus of the furane series. However, the production of furfural in the afore-described manner is not justified from an economic viewpoint, when the pentose concentration in the liquor is low and when the price of furfural is low. Therefore, the utilization of this "liquor" as a furfural source has been heretofore considered only as a theoretical possibility, which could not be carried out industrially. Commercial furfural has been obtained only from starting materials with a sufficiently high pentosan content, in order that the production be profitable. However, these starting materials have had drawbacks of a different kind, and furfural production has been burdened with high collection and transportation costs, due to their large volume of starting material and to the widely scattered distribution of the product source. The waste "liquor" is on the contrary obtainable in large quantities as a by-product of large scale industrial operations, and its economic utilization has presented a problem heretofore unsolved.

This invention relates to a procedure for the production of furfural from liquors which contain mainly pentoses for example those obtained from the cooking of deciduous wood, wherein the pentoses have been converted into furfural by known cyclizing methods. In accordance with the method of the present invention, production costs are cut and a practical process for producing furfural from bisulfite liquors is attained, even in cases where production was heretofore not justified from economic considerations.

An object of the invention is in the procedure for the processing of exhausted liquors in order to obtain furfural therefrom, wherein the heat input required for the distillation of furfural as obtained from the conversion of liquor pentoses and the total heat requirement is greatly reduced.

The object is attained by combining the disposal of exhausted liquors as a furfural source (or as a source of other useful products which are separated by distillation) with the utilization of the same liquor as a liquid fuel—which latter is already well known. To convert the liquor into a liquid fuel, it is necessary to concentrate it until a solids content of about 50% has been attained. This concentration is usually accomplished in a multiple stage, or a thermo-compression concentrator, wherein water is removed from liquor in the form of vapor, while the temperature thereof is gradually decreased. According to the invention, the processing of liquor is started in the same manner as usually followed for its concentration in order to obtain a low grade liquid fuel therefrom. Then, after the liquor has gone through a number of stages (the last ones), of the concentrator—but not through all of the stages—the furfural (or possibly other required products) is caused to form therein by any suitable means, for example by the addition of a mineral acid or of a salt thereof. Finally, the furfural containing liquor is passed through the remaining stages (the first ones) of concentrator, whereby the liquor is concentrated in the usual manner, and is utilized as a liquid fuel, while the vapor evolving from the liquor during this first stage, and which shows a relatively high furfural content, is utilized to heat the last stages of the concentrator, so that it is condensed thereon, collected and sent to the distillation column for separating the furfural therefrom. In this manner, a liquid having a high furfural content is obtained from a liquor poor in furfural, without any supplemental heat input since the heat consumption is equal to that which would at any rate be required for the concentration of liquor for combustion purposes. Thus a more complete utilization of liquor can be attained, and the production of furfural therefrom becomes a profitable operation. The particular stage after which the conversion of pentose into furfural is caused, is selected by taking into account the composition of liquor, the design of the concentrator, the maximum permissible water content of the fuel, and the minimum water content for effective cyclization in the liquor being concentrated, each of these latter opposing factors in the light of removal of the volatile furfural during the concentration stage so that a condensate is obtained which does not have too low a furfural content.

For the concentration, recourse may be made to a multiple stage concentrator, or to a series of at least two thermo-compression concentrators, one of which accomplishes the first concentration, carried out before the pentoses are converted into furfural, while the other accomplishes both the final concentration and the separation of furfural at the same time. When a multiple effect concentrator is used, the final concentration can be accomplished in the first stage or stages.

Two preferred forms of the invention—which are to be taken as not restrictive but as examples—are hereinafter described in the Examples I and II, and respectively illustrated in Figs. 1 and 2 of the drawing.

*Example I*

Figure 2:
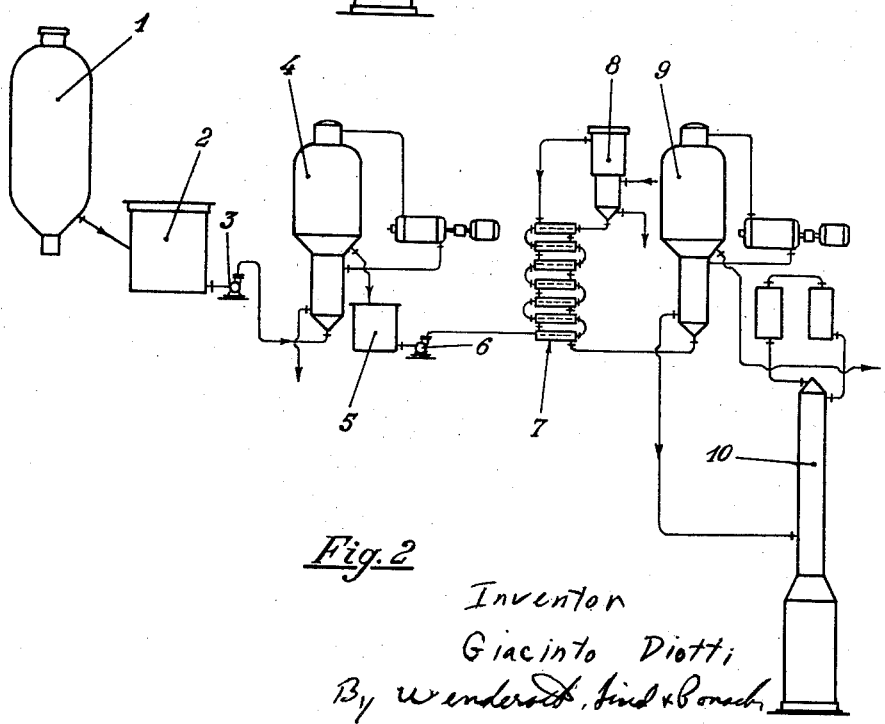

Referring to Fig. 1, the bisulfite liquor obtained from a beech wood charge which has been digested and which liquor at the end of cooking operation, has a dry solids content of 160–180 grs. per litre—of which 20–25 grs. are pentoses—is discharged at a temperature of 100–110° C. from digester 1 into the tank 2. It is then pumped by pump 3 into the last three elements of a four stage concentrator, wherein it is concentrated until a dry solids content of 310–330 grs. per litre is obtained, of which 26–32 grs. are pentoses. The liquor is then discharged from concentrator element 6 into a tank 7, and additions of diluted HCl are made thereto until a pH value of 2–2.5 is attained, whereupon the liquor is pumped by the pump 8, under a pressure of 3–4 kgs./sq. cm., to a superheater 9, in which it is heated to a temperature of 130–140° C., and kept at such temperature for about ten minutes. The liquor, now shows a furfural content of about 1.2–1.4% and is discharged from the superheater to the first element 10 of a four stage concentrator, in which it is concentrated to a dry solids content of 500–550 grs. per litre. All of the furfural present in the liquor is passed in the vapor which evolves from element 10 of the four stage concentrator, and this is utilized to heat all of the other elements of the same concentrator. Accordingly, a liquid having a furfural content of 5–6% is discharged from element 6 of concentrator and sent to the distillation column 11. The concentrated liquor discharged from element 10 of the four stage concentrator can be directly utilized as a low grade fuel.

The waste liquor containing furfural passes from superheater 9 to the element 10 where it concentrates and releases all its furfural as vapor together with steam. The mixture of steam and furfural vapor serves to heat the waste liquor passing into the element 6, and during this stage, furfural condenses and the condensed liquid is discharged from the element 6 and conveyed to the distillation column 11.

Each element 10 of the concentrator has:

(A) An inlet for the liquid to be concentrated.
(B) An outlet for the steam which is developed therein.
(C) A discharge outlet for the concentrated liquid.
(D) A heating steam inlet.
(E) A discharge outlet for the condensate formed by the heating steam.

These five openings of each element are connected with the openings of contiguous elements in the manner indicated in Fig. 1 of the drawing.

In element 10, furfural enters this element in the form of a liquid to be concentrated (point A), goes out as waste liquor (point B) and then enters the element 6 as heating vapor (point D) coming out as a condensate (point E).

*Example II*

The bisulfite liquor, obtained after an Eucalyptus wood charge has been digested, and which at the end of the cooking operation shows a solids content of 160–170 grs. per litre—of which 14–16 grs. are pentoses—is discharged at a temperature of 100–110° C. from digester 1 (see Fig. 2) into the tank 2, and then pumped by the pump 3 into the thermo-compression concentrator 4, wherein it is concentrated until a dry matter contents of 320–340 grs./litre (whereof 28+32 grs. of pentoses) is attained. The liquor is then discharged into a tank 5, wherein additions of diluted HCl are made thereto, until a pH value of 2–2.5 is attained, whereupon it is pumped by a pump 6, under a pressure of 3–4 kgs./sq. cm. into a heat exchanger 7, in which it is heated up to a temperature of 115°–125° C. Then the liquor is passed from the heat exchanger 7 into a superheater 8, where it is heated up to a temperature of 130°–140° C., and kept at such a temperature for about ten minutes. The liquor, which now shows a furfural contents of about 1.2–1.4% by weight is then pumped first to heat exchanger 7, wherein it is cooled down to about 100°–110° C., and then to a further thermo-compression concentrator 9, wherein it is ultimately concentrated until a dry matter contents of 520–560 grs. per litre is attained. All furfural present in the liquor is passed in the vapor evolved therefrom, and thus a condensed liquid with a furfural contents of 5–6% is obtained and sent to distillation column 10. The liquor that is discharged from concentrator 9, can be directly utilized as a low grade fuel.

While the invention has been described with some detail, it is to be understood that the description is for the purpose of illustration only, and is not definitive of the limits of the inventive idea, as variations and modifications and changes may be made therein as fall within the spirit and scope of the claim hereunto.

Having thus disclosed the invention, what is claimed is:

1. In a process for the recovery of furfural and fuel from waste bisulfite liquor in a concentrator comprising evaporating the liquor in a first concentration stage to raise the pentose content thereof and cyclizing the pentoses and hexoses contained in the concentrated liquor to form furfural therein, that improvement in the conservation of heat utilized in concentrating the liquor and cyclizing the contents thereof consisting of evaporatively concentrating the furfural containing liquor under superatmospheric pressure and at a temperature of about 100°–125° C. to form a low grade fuel residue and a condensate containing furfural, said condensate containing furfural being suitable for the recovery of pure furfural therefrom by distillation, recovering the heat evolved by the condensation of said furfural in a heat exchanger and returning the heat which is so recovered to said first concentration stage.

2. A process as in claim 1 wherein condensate containing furfural is separated from the furfural containing liquor during an early stage of several stages of concentration of said liquor whereby the fuel residue from this early stage contains water in excess of that present in the final fuel, whereafter this excess water is removed in a final stage of concentration.

3. A process as in claim 1 wherein said first concentration stage is conducted in at least one stage of a multiple stage concentrator, the remaining evaporative concentration is conducted in the several remaining stages of said concentrator, and the furfural vapors evolving from the evaporative concentration is collected from these several remaining stages.

4. A process as in claim 1 wherein the furfural vapors evolving from the evaporative concentration are passed over the first stage to heat this first stage and to condense these vapors and wherein the fuel recovered is used to heat the concentrator.

5. A process as in claim 4 wherein the liquor from the first concentration stage is concentrated to increase the solids content thereof to about twice that of the starting liquor.

References Cited in the file of this patent

UNITED STATES PATENTS

| 2,463,000 | Sevon | Mar. 1, 1949 |

FOREIGN PATENTS

| 422,330 | Italy | June 13, 1943 |
| 707,638 | Germany | June 28, 1941 |

OTHER REFERENCES

Perry: Chem. Engineers' Handbook (1950, 3d ed.), pp. 503, 508–10, 519.

Chem. Eng. Progress, vol. 44, No. 9, p. 673, September 1948.